United States Patent
Oswal et al.

(10) Patent No.: US 11,006,266 B2
(45) Date of Patent: May 11, 2021

(54) ONBOARDING DEVICE USING EMBEDDED SUBSCRIBER IDENTIFICATION MODULE

(71) Applicant: Cisco Technology, Inc., San Jose, CA (US)

(72) Inventors: Anand Oswal, Pleasanton, CA (US); Sudhir Kumar Jain, Fremont, CA (US); Rajesh S. Pazhyannur, Fremont, CA (US); Mark Grayson, Berkshire (GB)

(73) Assignee: CISCO TECHNOLOGY, INC., San Jose, CA (US)

( * ) Notice: Subject to any disclaimer, the term of this patent is extended or adjusted under 35 U.S.C. 154(b) by 142 days.

(21) Appl. No.: 16/291,727

(22) Filed: Mar. 4, 2019

(65) Prior Publication Data

US 2020/0288300 A1    Sep. 10, 2020

(51) Int. Cl.
| | |
|---|---|
| *H04W 8/20* | (2009.01) |
| *H04W 12/06* | (2021.01) |
| *H04W 60/00* | (2009.01) |
| *H04W 12/08* | (2021.01) |
| *H04W 12/50* | (2021.01) |

(52) U.S. Cl.
CPC .......... *H04W 8/205* (2013.01); *H04W 12/06* (2013.01); *H04W 12/08* (2013.01); *H04W 12/50* (2021.01); *H04W 60/00* (2013.01)

(58) Field of Classification Search
CPC ... H04W 12/003; H04W 12/06; H04W 12/08; H04W 60/00; H04W 8/205
See application file for complete search history.

(56) References Cited

U.S. PATENT DOCUMENTS

| | | | |
|---|---|---|---|
| 9,301,145 B2 | 3/2016 | Merrien et al. | |
| 9,408,012 B2 | 8/2016 | Li et al. | |
| 9,408,066 B2 | 8/2016 | Bradley | |
| 9,668,122 B2 | 5/2017 | Petersson et al. | |
| 10,567,952 B1* | 2/2020 | Finger | H04W 8/183 |
| 2013/0122864 A1* | 5/2013 | Haggerty | G06F 21/34 455/411 |
| 2015/0271173 A1* | 9/2015 | Seo | H04W 12/08 726/9 |

(Continued)

OTHER PUBLICATIONS

Ashwin Palekar et al., "Protected EAP Protocol (PEAP) Version 2", EAP Working Group, Internet-Draft, Category: Informational, <draft-josefsson-pppext-eap-tls-eap-10.txt>, Oct. 15, 2004, 87 pages.

(Continued)

*Primary Examiner* — Mewale A Ambaye
(74) *Attorney, Agent, or Firm* — Edell, Shapiro & Finnan, LLC (57) ABSTRACT

In one example, a server obtains, from a device having an embedded Subscriber Identification Module (eSIM), a unique identifier of the eSIM. The server validates the device based on the unique identifier of the eSIM. The server provides, to the device, a unique credential for a profile of the eSIM. The profile of the eSIM corresponds to a network of an enterprise. The server provides, to a credential database, the unique credential for the profile of the eSIM. The credential database including the unique credential for the profile of the eSIM indicates that the device is permitted to access the network of the enterprise.

20 Claims, 6 Drawing Sheets

(56) References Cited

U.S. PATENT DOCUMENTS

| | | | | |
|---|---|---|---|---|
| 2016/0006728 | A1* | 1/2016 | Park | H04W 12/0023 455/411 |
| 2018/0131699 | A1* | 5/2018 | Park | H04W 8/205 |
| 2018/0302781 | A1* | 10/2018 | Lee | H04W 12/0609 |
| 2020/0228969 | A1* | 7/2020 | Shin | H04W 48/18 |

OTHER PUBLICATIONS

Geek Magazine, hacker daily blog, "EAP-SIM authentication in WLAN", downloaded Dec. 14, 2018, 11 pages.

European Telecommunications Standards Institute, ETSI TC-SMG, "Digital cellular telecommunications system (Phase 2+); Specification of the Subscriber Identity Module—Mobile Equipment (SIM—ME) interface; (GSM 11.11)", Reference: TS/SMG-091111QR1, ICS: 33.060.50, GSM 11.11, Version 5.3.0, Jul. 1996, 113 pages.

Idemia, "3 reasons why eSIM is the future of enterprise connectivity", https://www.idemia.com/news/3-reasons-why-esim-future-enterprise-connectivity-2018-06-28, Jun. 28, 2018, 6 pages.

Wikipedia, "IEEE 802.1X", https://en.wikipedia.org/wiki/IEEE_802.1X, Oct. 22, 2018, 8 pages.

3GPP Organizational Partners, "3rd Generation Partnership Project; Technical Specification Group Core Network and Terminals; Characteristics of the Universal Subscriber Identity Module (USIM) application (Release 15)", 3GPP TS 31.102 V15.2.0, Oct. 2018, 186 pages.

H. Haverinen, Ed. et al., "Extensible Authentication Protocol Method for Global System for Mobile Communications (GSM) Subscriber Identity Modules (EAP-SIM)", Network Working Group, Request for Comments: 4186, Category: Informational, Jan. 2006, 92 pages.

J. Arkko et al., "Extensible Authentication Protocol Method for 3rd Generation Authentication and Key Agreement (EAP-AKA)", Network Working Group, Request for Comments: 4187, Category: Informational, Jan. 2006, 79 pages.

D. Simon et al., "The EAP-TLS Authentication Protocol", Network Working Group, Request for Comments: 5216, Obsoletes: 2716, Category: Standards Track, Mar. 2008, 34 pages.

J. Arkko et al., "Improved Extensible Authentication Protocol Method for 3rd Generation Authentication and Key Agreement (EAP-AKA')", Network Working Group, Request for Comments: 5448, Updates: 4187, Category: Informational, May 2009, 29 pages.

GSM Association, "RSP Technical Specification Version 2.2", Sep. 1, 2017, 264 pages.

Ruckus Wireless, Inc., "Hotspot 2.0 Release 2 Accelerating the Move to Automatic and Secure Roaming When Using Wi-Fi Technology", Dec. 2014, 4 pages.

* cited by examiner

ONBOARDING DEVICE USING EMBEDDED SUBSCRIBER IDENTIFICATION MODULE

TECHNICAL FIELD

The present disclosure relates to device onboarding.

BACKGROUND

An enterprise network (e.g., a Wi-Fi® enterprise network) can be accessed by various types of devices, including headed and headless devices. Headed devices include devices with a User Interface (UI), such as smartphones or laptops. Headed devices are typically used by employees and/or guests to access the enterprise network. Headless devices include devices without a UI, such as Internet of Things devices (e.g., temperature sensors). When a headed or headless device attempts to gain access to an enterprise network for the first time, that device often undergoes the process of network onboarding. Once a device has been successfully onboarded, subsequent attempts to gain access to the enterprise network can be automated.

DESCRIPTION OF EXAMPLE EMBODIMENTS

Overview

In one example, a server obtains, from a device having an embedded Subscriber Identification Module (eSIM), a unique identifier of the eSIM. The server validates the device based on the unique identifier of the eSIM. The server provides to the device a unique credential for a profile of the eSIM. The profile of the eSIM corresponds to a network of an enterprise. The server provides, to a credential database, the unique credential for the profile of the eSIM. The credential database including the unique credential for the profile of the eSIM indicates that the device is permitted to access the network of the enterprise.

Example Embodiments

Figure 1:
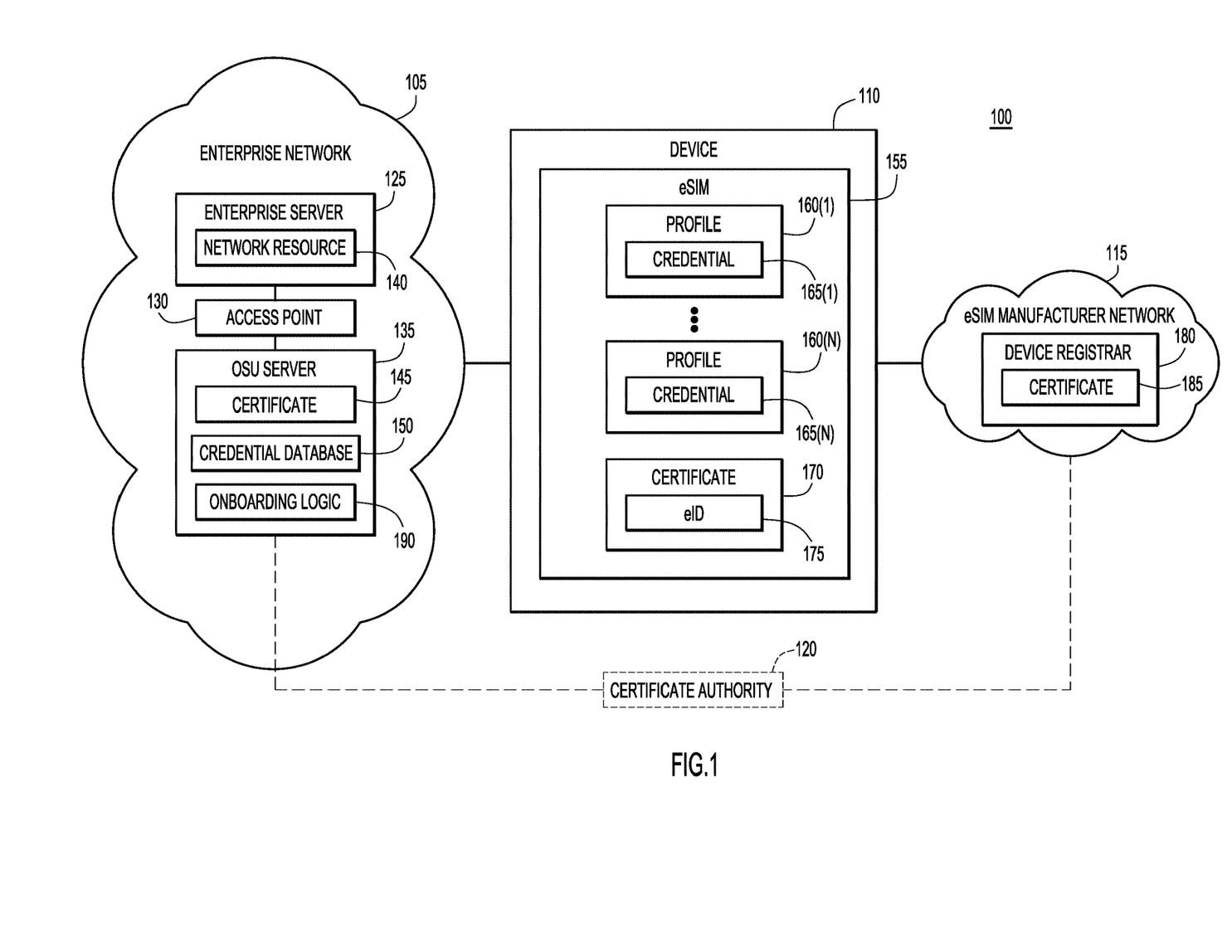
FIG. 1 illustrates a system for network onboarding using an embedded Subscriber Identification Module (eSIM), according to an example embodiment.

FIG. 1 illustrates an example system 100 for network onboarding. System 100 includes enterprise network 105, device 110, embedded Subscriber Identification Module (eSIM) manufacturer network 115, and, optionally, Certificate Authority (CA) 120. Enterprise network 105 includes enterprise server 125, Access Point (AP) 130, and Online Sign-Up (OSU) server 135. Enterprise server 125 includes network resource 140. OSU server 135 includes certificate 145 and credential database 150. In another example, credential database 150 may be a separate entity from (e.g., external to) OSU server 135 and/or enterprise network 105. In this case, credential database 150 may be accessible by other enterprise systems. Enterprise network 105 may comprise a Wide Area Network (WAN) and/or a Local Area Network (LAN), and may be wired and/or wireless. In one specific example, enterprise network 105 is a Wireless LAN (WLAN) that operates based on Institute of Electrical and Electronics Engineers (IEEE) 802.1X (e.g., using Wi-Fi® technology).

Device 110 may be a headed device or a headless device which includes eSIM 155 (e.g., an embedded Universal Integrated Circuit Card (eUICC)). eSIM 155 allows device 110 to switch between different networks. Unlike traditional removable/replaceable SIM cards, eSIM 155 is not designed for removability and is therefore protected against physical theft. Whereas traditional SIM cards each correspond to a different network, and therefore need to be replaced when switching between different networks, eSIM 155 need not be physically replaced to allow device 110 to switch between different networks. Instead, eSIM 155 stores profiles 160(1)-160(N), each corresponding to a different network. Each profile 160(1)-160(N) includes a respective unique credential 165(1)-165(N) which enables access to (e.g., provides authentication for) the corresponding network. For example, eSIM 155 may choose profile 160(1) to connect to a first network, profile 160(2) to connect to a second network, etc. In one example, only one of profiles 160(1)-160(N) may be selected at any given time. eSIM 155 may support Over-The-Air (OTA) programmability of profiles 160(1)-160(N). eSIM 155 also includes certificate 170 which stores eSIM Identifier (eID) 175 (e.g., a serial number corresponding to eSIM 155).

eSIM manufacturer network 115 includes device registrar 180, which includes certificate 185. In one example, an eSIM manufacturer associated with eSIM manufacturer network 115 may manage device registrar 180 and, in particular, install certificate 185 on device registrar 180. The eSIM manufacturer also installs certificate 170 on eSIM 155 during the manufacturing of device 110. It will be appreciated that, because eSIM 155 is not configured for removability, eSIM 155 may be manufactured with (as part of) device 110. In one example, the eSIM manufacturer may additionally provide certificate 145 to OSU server 135 (although OSU server 135 is managed/maintained by enterprise network 105). In another example, CA 120 may provide certificate 145 to OSU server 135.

In this example, device 110 is attempting to access enterprise network 105 for the first time in order to, for example, obtain access to network resource 140. Because device 110 is accessing network 105 for the first time, device 110 must undergo a network onboarding process. Conventionally, the network onboarding process is complicated and inefficient. For example, for headed devices, users (e.g., guests) typically must follow a series of complex steps in order to successfully complete the onboarding process and obtain access to a network. A typical onboarding process may require the user to perform the following steps on a headed device (e.g., smartphone):

1) Choose an Extensible Authentication Protocol (EAP) method from a list of EAP methods (e.g., Protected EAP (PEAP)).

2) Choose Phase 2 Authentication (e.g., "None").

3) Fill in username field (e.g., enter the user's name in the "Identity" field but leave the "Anonymous Identity" field blank).

These steps can be particularly challenging for users with little or no onboarding experience, and can take an inordinate amount of time even for users with prior onboarding experience. Moreover, setting up IEEE 802.1X credentials for EAP (e.g., EAP Tunneled Transport Layer Security (EAP-TTLS) or PEAP) can be overly complex for the enterprise. In addition, enterprises change passwords periodically, which requires end users to update their passwords and repeat one or more steps in the onboarding process. Network onboarding for headless devices is similarly challenging. Accordingly, in order to alleviate the aforementioned problems in conventional network onboarding approaches, onboarding logic 190 is provided in OSU server 135. Briefly, onboarding logic 190 simplifies network onboarding for device 110 using eSIM 155.

In one example, OSU server 135 obtains, from device 110, a unique identifier of eSIM 155 (e.g., eID 175). OSU server 135 may obtain eID 175 through enterprise network 105 (e.g., via AP 130). OSU server 135 validates device 110 based on eID 175. In one example, OSU server 135 and device 110 may validate each other using a mutual authentication process based on certificates 145 and 170. Once OSU server 135 has validated device 110, OSU server 135 provides, to device 110, unique credential 165(N) for profile 160(N). Profile 160(N) corresponds to enterprise network 105. OSU server 135 may provide, to credential database 150, unique credential 165(N). Credential database 150 including unique credential 165(N) indicates that device 110 is permitted to access enterprise network 105. In one example, credential database 150 may be accessed via AP 130 to enable authentication.

Previously, eSIMs have only been used to enable access to service provider networks (e.g., 3G/4G/5G networks), and not enterprise networks (e.g., Wi-Fi networks). That is, conventionally, every profile 160(1)-160(N) on eSIM 155 would correspond to a respective service provider network. In contrast, techniques presented herein enable an eSIM to store profiles which correspond to service provider networks and/or profiles which correspond to enterprise networks. For instance, in the example of FIG. 1, profile 160(N) corresponds to enterprise network 105. By causing eSIM 155 to store profile 160(N), OSU server 135 improves/simplifies the onboarding process. Furthermore, by integrating OSU server 135 into the PKI architecture of eSIM manufacturer network 115, the provisioning of profile(s) 160(1)-160(N) is offloaded from eSIM manufacturer network 115.

Figure 2:
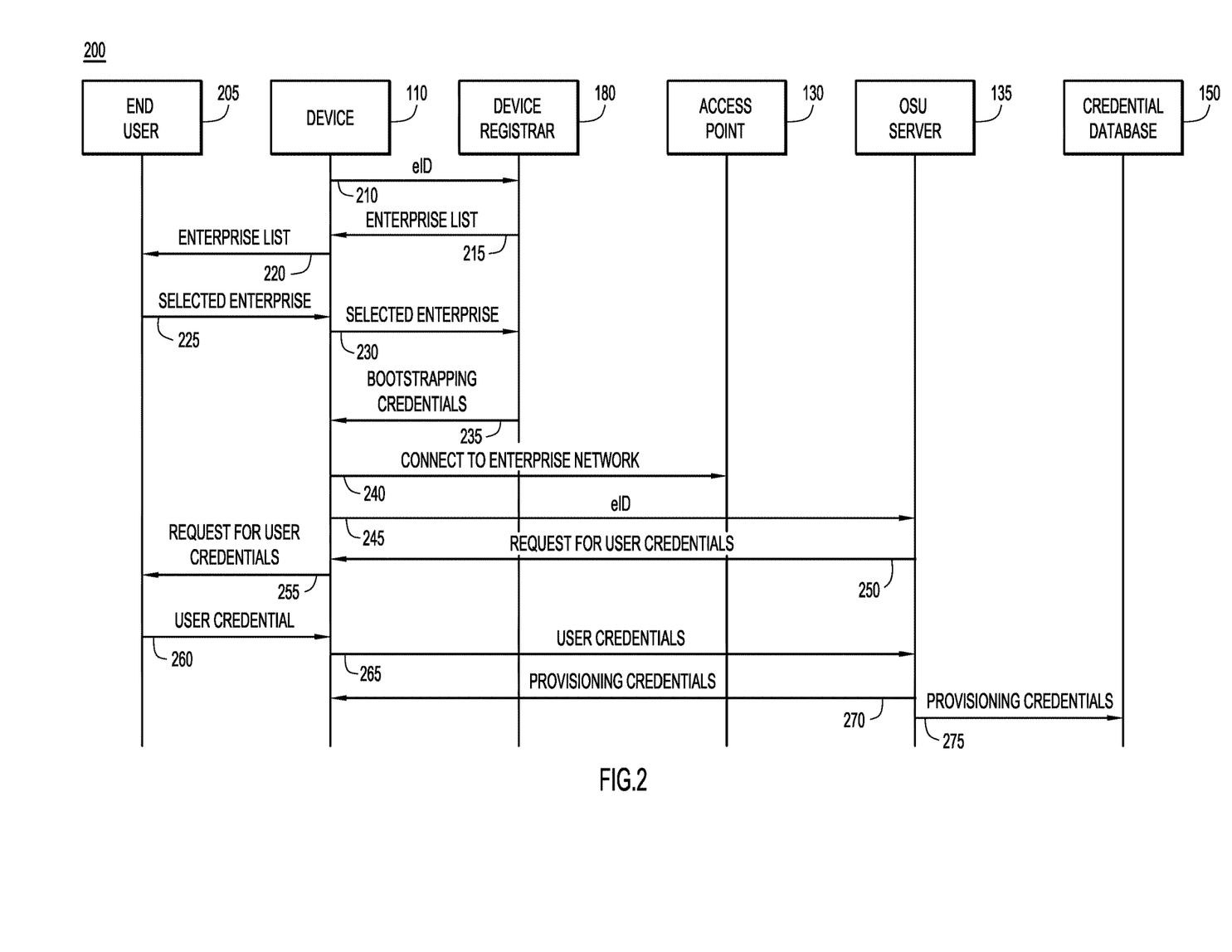
FIG. 2 illustrates a sequence diagram for network onboarding for a headed device, according to an example embodiment.

FIG. 2 illustrates a sequence diagram 200 for network onboarding for device 110, which in this example is a headed device. Continuing reference is made to FIG. 1 for purposes of the description of FIG. 2. Diagram 200 illustrates communications provided/obtained by end user 205, device 110, device registrar 180, AP 130, OSU server 135, and credential database 150. Initially, device 110 is unprovisioned (e.g., does not yet have fully configured profile), and connects to any available Service Set ID (SSID) for Internet connectivity (e.g., through AP 130 or another AP). At 210, once device 110 has established Internet connectivity, device 110 provides, to device registrar 180, eID 175. Device registrar 180 may authenticate device 110 based on certificate 145. In one example, device registrar 180 and device 110 may validate each other using a mutual authentication process based on certificates 170 and 185.

At 215, device 110 obtains, from device registrar 180, information identifying a plurality of potential enterprises. The information identifying the potential enterprises includes the enterprise associated with enterprise network 105. In one example, device registrar 180 causes device 110 to link to a webpage that provides a list of enterprises that have registered to be included on the list (thus, in this example, the enterprise associated with enterprise network 105 has registered to be included on the list). At 220, device 110 generates a graphical representation of the information identifying the plurality of potential enterprises for end user 205. For example, device 110 may display the list for end user 205. At 225, device 110 obtains, from end user 205, a selection of the enterprise associated with enterprise network 105 from the plurality of potential enterprises.

At 230, in response to obtaining the selection of the enterprise associated with enterprise network 105, device 110 provides, to device registrar 180, an indication of the enterprise associated with enterprise network 105. At 235, device 110 obtains, from device registrar 180, bootstrapping credentials for connecting to enterprise network 105. The bootstrapping credentials may include an SSID associated with enterprise network 105 and/or a password for the SSID and/or an EAP identity. In one example, the SSID may be used only to access the enterprise segment containing OSU server 135 (and not for production enterprise services). If enterprise network 105 uses a different root of trust from eSIM manufacturer network 115, the root of trust for enterprise network 105 may also be downloaded to device 110.

Device 110 may further obtain, from device registrar 180, information for accessing OSU server 135 (e.g., an identification/Uniform Resource Locator (URL) of OSU server 135). At 240, based on the bootstrapping credentials, device 110 connects to enterprise network 105. Upon connecting to enterprise network 105, the SSID enables device 110 to connect to OSU server 135.

At 245, OSU server obtains eID 175 from device 110, and validates device 110 based on eID 175. In one example, OSU server 135 and device 110 may validate each other using a mutual authentication process based on certificates 145 and 170. At 250, OSU server 135 provides, to device 110, a request for user credentials. The user credentials may be, for example, a username and password. At 255, device 110 generates a graphical representation of the request for the user credentials. For example, device 110 may display the request for the user credentials for end user 205. At 260, device 110 obtains the user credentials from end user 205. At 265, OSU server 135 obtains the user credentials from device 110. OSU server 135 thereby validates the identity of end user 205.

At 270, in response to obtaining the user credentials, OSU server 135 provides, to device 110, credential 165(N). OSU server 135 may remotely provision eSIM 155 with credential 165(N) using a modified version of Remote SIM Provisioning (RSP) as specified in Global System for Mobile communications Association (GSMA) SGP.22. Credential 165(N) may be a password, token, numerical string, etc. (e.g., a unique credential for EAP Authentication and Key Agreement (EAP-AKA)). Credential 165(N) may be hidden from end user 205.

At 275, OSU server 135 provides credential 165(N) to credential database 150. In one example, OSU server 135 provides a mapping of credential 165(N) to end user 205 to indicate that a device with eID 175 belongs to end user 205 and should therefore be permitted access to enterprise 105. Device 110 may thereby access enterprise network 105 for as long as credential 165(N) remains active. This length of time for which credential 165(N) is active may vary depending on the specific use case, and may be configurable.

Subsequently (e.g., minutes, hours, days, weeks, months, etc.), device 110 may attempt to gain access to enterprise network 105. In particular, device 110 may provide, to enterprise network 105, credential 165(N) from eSIM 155. In response to credential database 150 including credential 165(N), device 110 may obtain access to enterprise network 105. For example, enterprise network 105 may signal an EAP server that then signals credential database 150 in order to authenticate device 110 using credential 165(N).

An example method for a headless device to obtain a security credential is provided as follows. First, the headless device contacts a device registrar based on a stored identity of an eSIM provider. Next, the device registrar determines the identity of an OSU server based on the identity of the device. The device registrar then provides the identity of the OSU server to the device. Fourth, the device contacts the OSU server. The device and OSU server then mutually authenticate based on a stored certificate on the eSIM and eSIM provider signed certificate on the OSU server. The OSU server provides the device with onboarding credentials. Finally, the OSU server provides credentials using Hotspot 2.0 (HS2.0) OSU.

Figure 3:
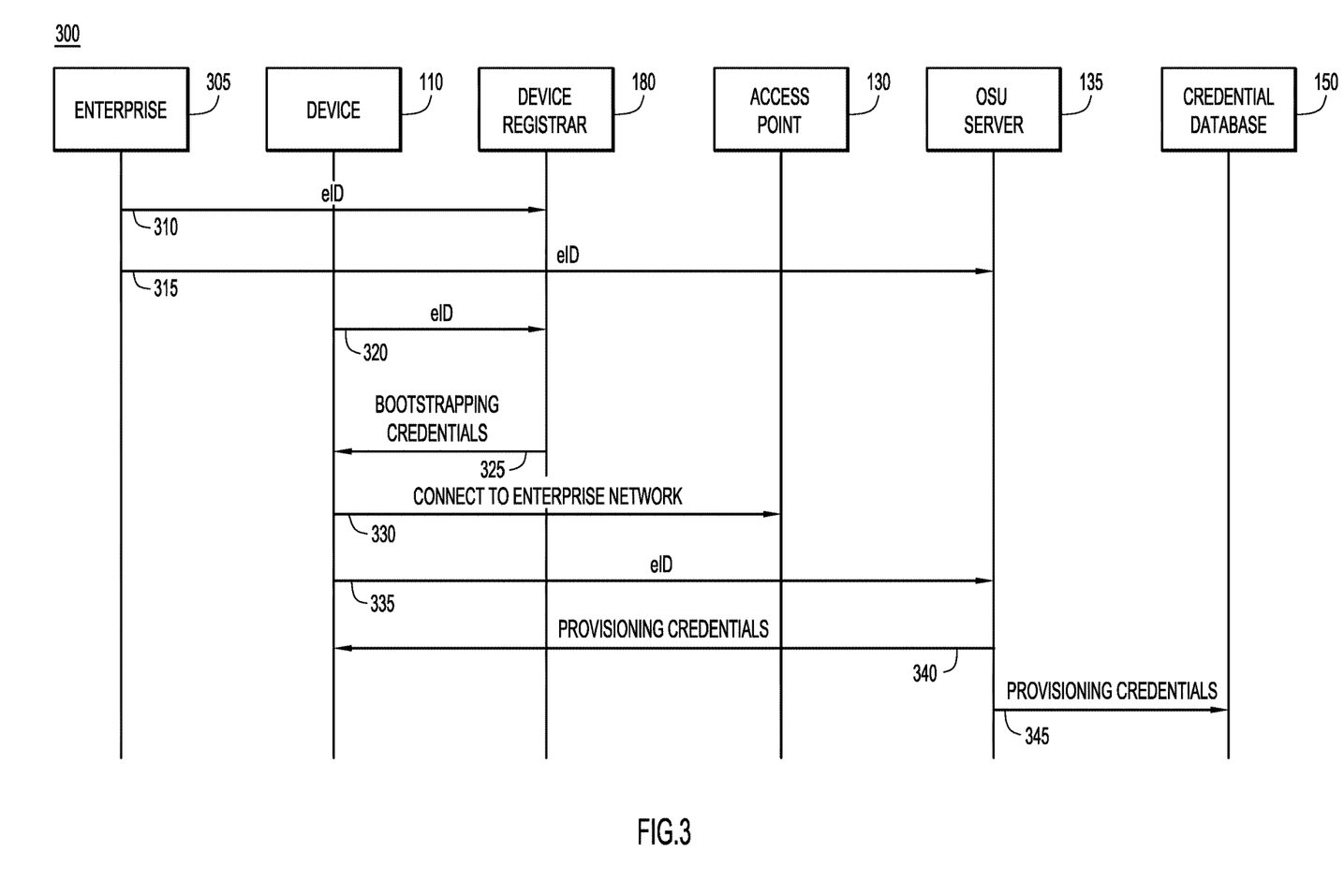
FIG. 3 illustrates a sequence diagram for network onboarding for a headless device, according to an example embodiment.

FIG. 3 illustrates a sequence diagram 300 for network onboarding for device 110, which in this example is a headed device. Continuing reference is made to FIG. 1 for purposes of the description of FIG. 3. Diagram 300 illustrates communications provided/obtained by enterprise 305, device 110, device registrar 180, AP 130, OSU server 135, and credential database 150. Enterprise 305 is the enterprise associated with enterprise network 105. In one example, a network administrator of enterprise network 105 may perform operations described herein on behalf of enterprise 305.

At 310, device registrar 180 obtains, from enterprise 305, an indication that eID 175 is associated with enterprise 305. At 315, OSU server 135 obtains, from enterprise 305, an indication that eID 175 is associated with enterprise 305. Thus, device registrar 180 and OSU server 135 are made aware that eID 175/device 110 is associated with enterprise 305. It will be appreciated that operations 310 and 315 may occur in any order (e.g., operation 315 may occur before 310, or operations 310 and 315 may occur simultaneously or nearly simultaneously). Upon obtaining the indication that eID 175 is associated with enterprise 305, OSU server 135 may store a mapping of eID 175 to enterprise 305. In one example, OSU server 135 may store a list/database/repository respectively mapping a plurality of eIDs (including eID 175) to a plurality of enterprises (e.g., enterprise 305).

Initially, device 110 is unprovisioned (e.g., does not yet have fully configured profile 160(N)), and connects to any available SSID for Internet connectivity (e.g., through AP 130 or any other AP). At 320, once device 110 has established Internet connectivity, device 110 provides eID 175 to device registrar 180. Device registrar 180 may authenticate device 110 based on certificate 145. In one example, device registrar 180 and device 110 may validate each other using a mutual authentication process based on certificates 170 and 185.

At 325, device 110 obtains, from device registrar 180, bootstrapping credentials for connecting to enterprise network 105. The bootstrapping credentials may include an SSID associated with enterprise network 105 and/or a password for the SSID. This operation may be similar to operation 235 in FIG. 2. In one example, device 110 may further obtain, from device registrar 180, information for accessing OSU server 135 (e.g., an identification/URL of OSU server 135). At 330, based on the bootstrapping credentials, device 110 connects to enterprise network 105. Upon connecting to enterprise network 105, AP 130 redirects device 110 to OSU server 135.

At 335, OSU server 135 obtains eID 175 from device 110, and validates device 110 based on eID 175. In one example, OSU server 135 and device 110 may validate each other using a mutual authentication process based on certificates 145 and 170. At 340, OSU server 135 provides credential 165(N) to device 110. OSU server 135 may remotely provision eSIM 155 with credential 165(N) using a modified version of RSP as specified in GSMA SGP.22. Credential 165(N) may be a password, token, numerical string, etc. (e.g., a unique credential for EAP-AKA).

At 345, OSU server 135 provides credential 165(N) to credential database 150. In one example, OSU server 135 provides a mapping of credential 165(N) to enterprise 305 to indicate that a device with eID 175 belongs to enterprise 305 and should therefore be permitted access to enterprise network 105. Device 110 may thereby access enterprise network 105 for as long as credential 165(N) remains active. The length of time for which credential 165(N) is active may vary depending on the specific use case, and may be configurable. Subsequently (e.g., minutes, hours, days, weeks, months, etc.), device 110 may attempt to gain access to enterprise network 105. In particular, device 110 may provide, to enterprise network 105, credential 165(N) from eSIM 155. In response to credential database 150 including credential 165(N), device 110 may obtain access to enterprise network 105. For example, enterprise network 105 may signal an EAP server that then signals credential database 150 in order to authenticate device 110 using credential 165(N).

Figure 4:
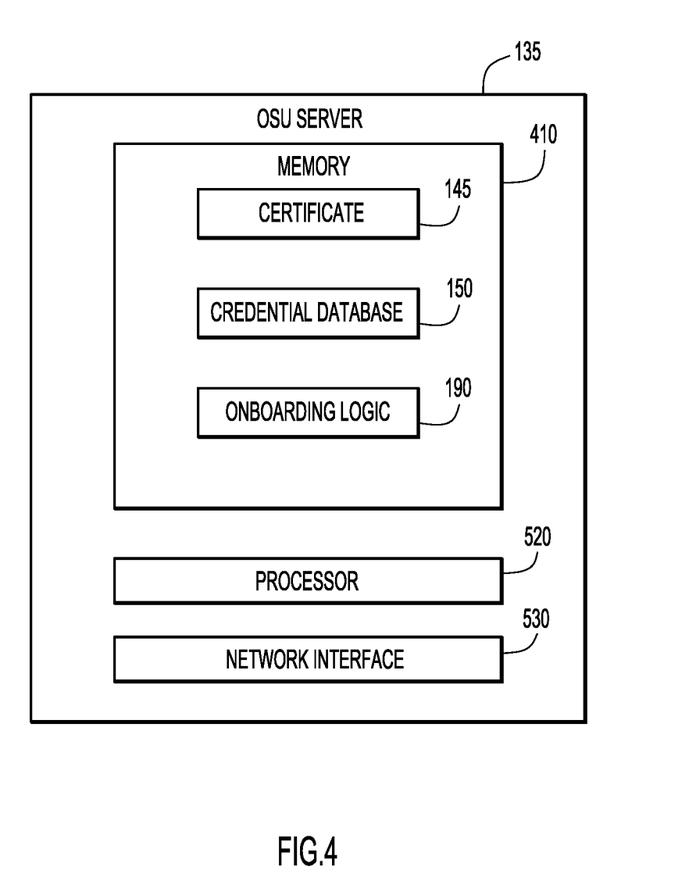
FIG. 4 is a block diagram of an Online Sign-Up (OSU) server configured to execute network onboarding techniques, according to an example embodiment.

FIG. 4 is a simplified block diagram of OSU server 135. In this example, OSU server 135 includes memory 410, one or more processors 420, and network interface 430. Memory 410 stores certificate 145, credential database 150, and instructions for onboarding logic 190. One or more processors 420 are configured to execute instructions stored in memory 410 for OSU server 135. When executed by one or more processors 420, onboarding logic 190 causes OSU server 135 to perform operations described herein. Network interface 430 is a network interface card (or multiple instances of such a device) or other network interface device that enables network communications on behalf of the OSU server 135 for sending and receiving messages as described herein.

Memory 410 may be read only memory (ROM), random access memory (RAM), magnetic disk storage media devices, optical storage media devices, flash memory devices, electrical, optical, or other physical/tangible memory storage devices. Thus, in general, memory 410 may be one or more tangible (non-transitory) computer readable storage media (e.g., a memory device) encoded with software comprising computer executable instructions and when the software is executed (by processor 420) it is operable to perform operations described herein.

Figure 5:
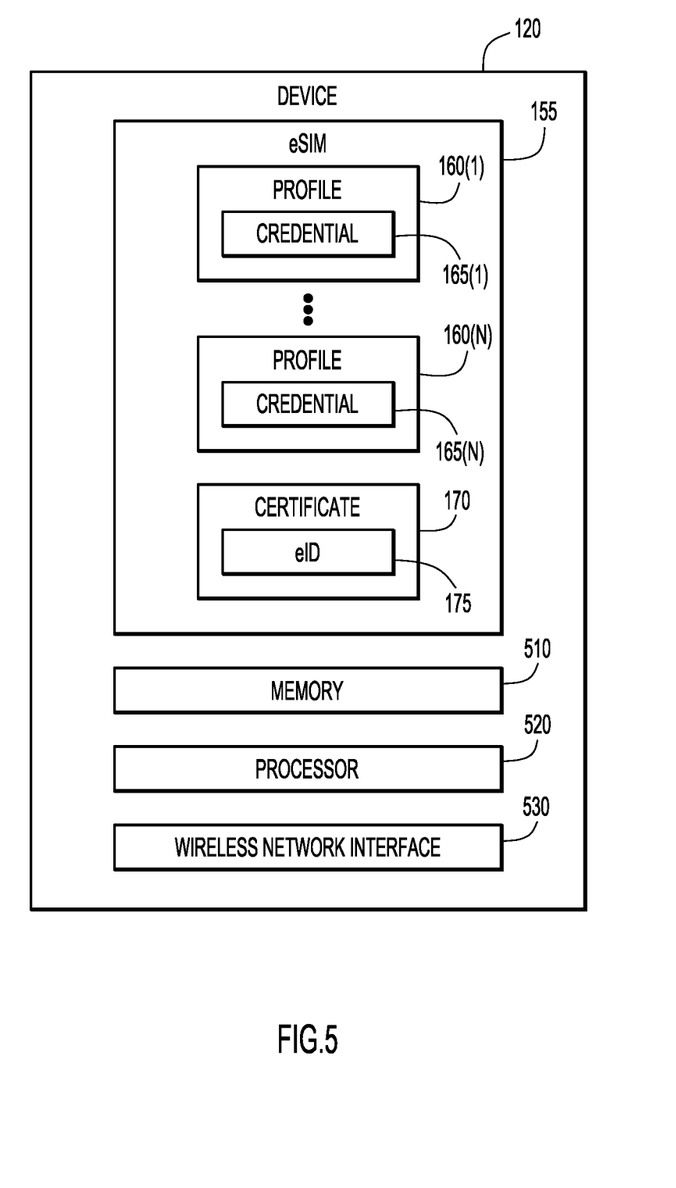
FIG. 5 is a block diagram of a headed or headless device configured to execute network onboarding techniques, according to an example embodiment.

FIG. 5 is a simplified block diagram of device 110. Device 110 may be headed or headless. In this example, device 110 includes eSIM 155, memory 510, one or more processors 520, and network interface 530. One or more processors 520 are configured to execute instructions stored in memory 510 for device 110. When executed by one or more processors 520, instructions stored in memory 510 cause device 110 to perform operations described herein.

Wireless network interface 530 is a network interface card (or multiple instances of such a device) or other network interface device that enables network communications on behalf of device 110 for sending and receiving messages as described herein. Wireless network interface 530 may be a wireless communications interface configured to operate in accordance with any other suitable technology now known or hereinafter developed (e.g., Wi-Fi). Wireless network interface 530 may be operable to communicate over a WLAN, WAN, etc.

Memory 510 may be ROM, RAM, magnetic disk storage media devices, optical storage media devices, flash memory devices, electrical, optical, or other physical/tangible memory storage devices. Thus, in general, memory 510 may be one or more tangible (non-transitory) computer readable storage media (e.g., a memory device) encoded with software comprising computer executable instructions and when the software is executed (by processor 520) it is operable to perform operations described herein.

Data relating to operations described herein may be stored within any conventional or other data structures (e.g., files, arrays, lists, stacks, queues, records, etc.) and may be stored in any desired storage unit (e.g., database, data or other repositories, queue, etc.). The data transmitted between entities may include any desired format and arrangement, and may include any quantity of any types of fields of any size to store the data. The definition and data model for any datasets may indicate the overall structure in any desired fashion (e.g., computer-related languages, graphical representation, listing, etc.).

The present embodiments may employ any number of any type of user interface (e.g., Graphical User Interface (GUI), command-line, prompt, etc.) for obtaining or providing information, where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The environment of the present embodiments may include any number of computer or other processing systems (e.g., client or end-user systems, server systems, etc.) and databases or other repositories arranged in any desired fashion, where the present embodiments may be applied to any desired type of computing environment (e.g., cloud computing, client-server, network computing, mainframe, stand-alone systems, etc.). The computer or other processing systems employed by the present embodiments may be implemented by any number of any personal or other type of computer or processing system (e.g., desktop, laptop, Personal Digital Assistant (PDA), mobile devices, etc.), and may include any commercially available operating system and any combination of commercially available and custom software (e.g., machine learning software, etc.). These systems may include any types of monitors and input devices (e.g., keyboard, mouse, voice recognition, etc.) to enter and/or view information.

It is to be understood that the software of the present embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present embodiments may be distributed in any manner among the various end-user/client and server systems, and/or any other intermediary processing devices. The software and/or algorithms described herein may be modified in any manner that accomplishes the functions described herein. In addition, the functions described herein may be performed in any order that accomplishes a desired operation.

The software of the present embodiments may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, Virtual Private Network (VPN), etc.). The computer or other processing systems of the present embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., LAN, hardwire, wireless link, Intranet, etc.).

Figure 6:
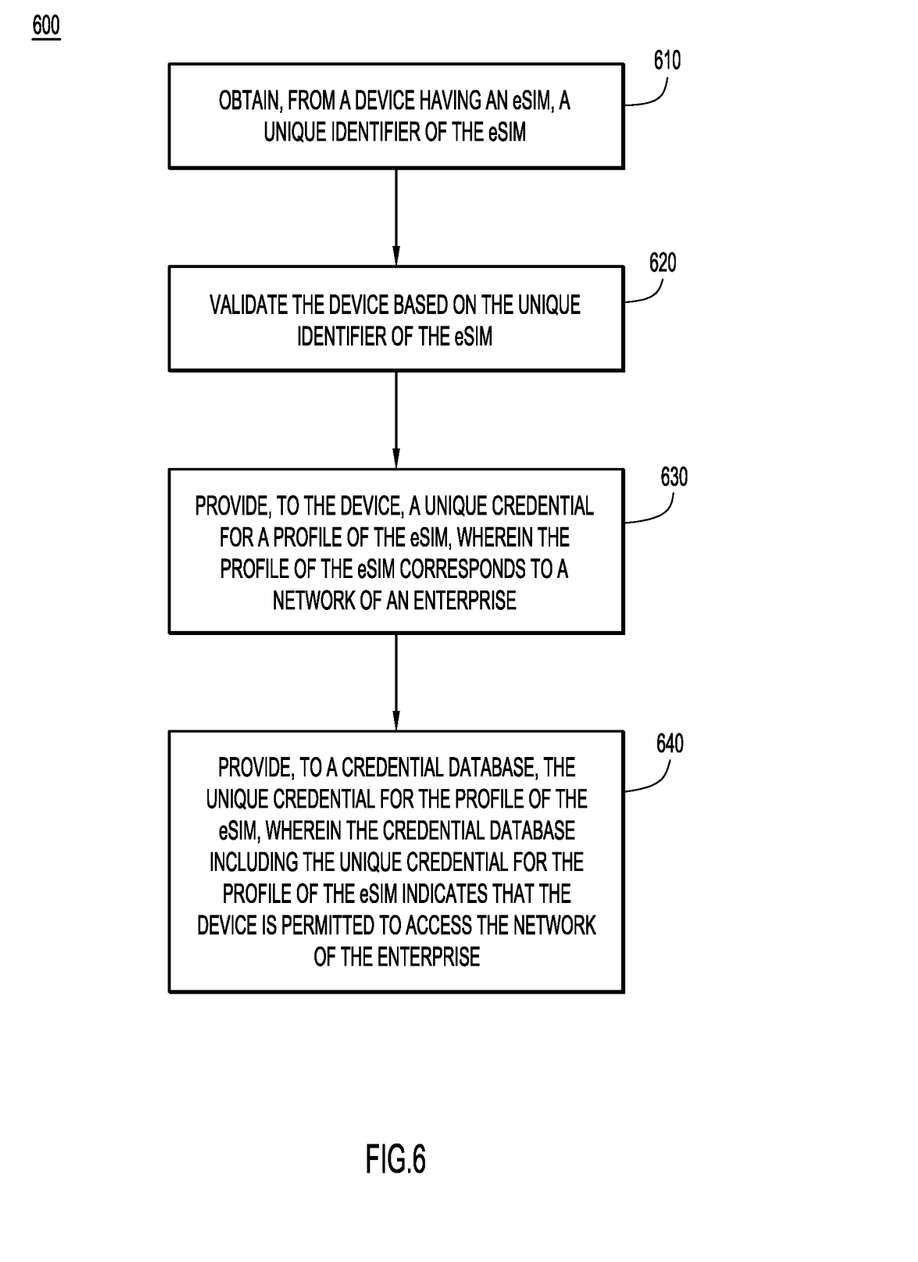
FIG. 6 is a flowchart of a method for network onboarding using an eSIM, according to an example embodiment.

FIG. 6 is a flowchart of an example method 600 for network onboarding using an eSIM. Method 600 may be performed by a server (e.g., OSU server 135). Reference is also made to FIG. 1 for purposes of describing the method 600. At 610, the OSU server obtains, from a device having an eSIM, a unique identifier of the eSIM. At 620, the OSU server validates the device based on the unique identifier of the eSIM. At 630, the OSU server provides, to the device, a unique credential for a profile of the eSIM, wherein the profile of the eSIM corresponds to a network of an enterprise. At 640, the OSU server provides, to a credential database, the unique credential for the profile of the eSIM, wherein the credential database including the unique credential for the profile of the eSIM indicates that the device is permitted to access the network of the enterprise.

In one example, an original Subscription Manager Data Preparation (SM-DP) entity may build a security association with an enterprise provisioning platform. The SM-DP may then provision an enterprise profile on a device. The device may use this enterprise profile to contact the enterprise provisioning platform, which is responsible for delivering the end user credentials. Subsequent to (remote) programming, the device with the eSIM may use separate profiles for cellular and Wi-Fi, and specifically the enterprise programmed profile for enterprise Wi-Fi.

An eSIM may be used in a two-stage bootstrapping procedure. In the first stage, the eSIM connects securely to a device registrar (e.g., associated with the entity that provides the eSIM). The device may connect to the device registrar securely based on in-built credentials. At this stage, the device registrar may provide, to the device, enterprise specific bootstrapping credentials (e.g., credentials to enable provisioning by an enterprise entity). Furthermore, the eSIM may be used for Wi-Fi onboarding.

Techniques presented herein may provide automated onboarding for headed and/or headless devices. In particular, an enterprise may deploy a system that enables remote eSIM programming of employee owned devices and headless Internet of Things (IoT) devices. These techniques may be simpler to deploy/maintain than certificate based systems and more secure than usernames/passwords generated by users.

A relationship between the enterprise and eSIM vendor (e.g., eSIM manufacturer) allows the eSIM vendor to provide an enterprise provisioning URL when requested by a device. Accordingly, when the device contacts the eSIM vendor (e.g., device registrar), the eSIM vendor provides a URL to an enterprise provisioning server (e.g., OSU server). The device may download security credentials from the enterprise provisioning server. The enterprise provisioning server may thereby deploy the security credentials/profile on the eSIM.

In one form, a method is provided. The method comprises: at a server: obtaining, from a device having an eSIM, a unique identifier of the eSIM; validating the device based on the unique identifier of the eSIM; providing, to the device, a unique credential for a profile of the eSIM, wherein the profile of the eSIM corresponds to a network of an enterprise; and providing, to a credential database, the unique credential for the profile of the eSIM, wherein the credential database including the unique credential for the profile of the eSIM indicates that the device is permitted to access the network of the enterprise.

In one example, the method further comprises: at the device: providing, to the network of the enterprise, the unique credential of the eSIM; and in response to the credential database including the unique credential for the profile of the eSIM, obtaining access to the network of the enterprise.

In one example, the device is a headed device, and the method further comprises: at the server: providing, to the device, a request for user credentials; obtaining, from the device, the user credentials; and in response to obtaining the user credentials, providing the unique credential for the profile of the eSIM to the device.

In one example, the device is a headed device, and the method further comprises: at the device: providing, to a device registrar, the unique identifier of the eSIM; and obtaining, from the device registrar, information identifying a plurality of potential enterprises including the enterprise. In an additional example, the method further comprises: at the device: generating a graphical representation of the information identifying the plurality of potential enterprises; obtaining a selection of the enterprise from the plurality of potential enterprises; in response to obtaining the selection of the enterprise, providing an indication of the enterprise to the device registrar; obtaining, from the device registrar, bootstrapping credentials for connecting to the network of the enterprise; and based on the bootstrapping credentials, connecting to the network of the enterprise.

In one example, the device is a headless device, and the method further comprises: at the server: obtaining, from the enterprise, an indication that the unique identifier of the eSIM is associated with the enterprise.

In one example, the device is a headless device, and the method further comprises: at the device: providing the unique identifier of the eSIM to a device registrar, wherein the device registrar obtains, from the enterprise, an indication that the unique identifier of the eSIM is associated with the enterprise; obtaining, from the device registrar, bootstrapping credentials to connect to the network of the enterprise; and based on the bootstrapping credentials, connecting to the network of the enterprise.

In another form, a system is provided. The system comprises: a device having an eSIM; a network of an enterprise; and a server, wherein the server is configured to: obtain, from the device, a unique identifier of the eSIM; validate the device based on the unique identifier of the eSIM; provide, to the device, a unique credential for a profile of the eSIM, wherein the profile of the eSIM corresponds to the network of the enterprise; and provide, to a credential database, the unique credential for the profile of the eSIM, wherein the credential database including the unique credential for the profile of the eSIM indicates that the device is permitted to access the network of the enterprise.

In another form, one or more non-transitory computer readable storage media are provided. The non-transitory computer readable storage media are encoded with instructions that, when executed by one or more processors, cause the one or more processors to: obtain, from a device having an eSIM, a unique identifier of the eSIM; validate the device based on the unique identifier of the eSIM; provide, to the device, a unique credential for a profile of the eSIM, wherein the profile of the eSIM corresponds to a network of an enterprise; and provide, to a credential database, the unique credential for the profile of the eSIM, wherein the credential database including the unique credential for the profile of the eSIM indicates that the device is permitted to access the network of the enterprise.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
   at a server:
      obtaining, from a device having an embedded Subscriber Identification Module (eSIM), a unique identifier of the eSIM;
      validating the device based on the unique identifier of the eSIM;
      providing, to the device, a unique credential for a profile of the eSIM, wherein the profile of the eSIM corresponds to a network of an enterprise, and wherein the device provides, to the network of the enterprise, the unique credential for the profile of the eSIM; and
      providing, to a credential database, the unique credential for the profile of the eSIM, wherein in response to the credential database including the unique credential for the profile of the eSIM, the device obtains access to the network of the enterprise.

2. The method of claim 1, wherein the device is a headed device, and further comprising:
   at the server:
      providing, to the device, a request for user credentials; and
      obtaining, from the device, the user credentials.

3. The method of claim 1, wherein the device is a headed device, and further comprising:
   at the device:

providing, to a device registrar, the unique identifier of the eSIM; and obtaining, from the device registrar, information identifying a plurality of potential enterprises including the enterprise.

4. The method of claim 3, further comprising:

at the device:

generating a graphical representation of the information identifying the plurality of potential enterprises;

obtaining a selection of the enterprise from the plurality of potential enterprises;

in response to obtaining the selection of the enterprise, providing an indication of the enterprise to the device registrar;

obtaining, from the device registrar, bootstrapping credentials for connecting to the network of the enterprise; and based on the bootstrapping credentials, connecting to the network of the enterprise.

5. The method of claim 1, wherein the device is a headless device, and further comprising:

at the server:

obtaining, from the enterprise, an indication that the unique identifier of the eSIM is associated with the enterprise.

6. The method of claim 1, wherein the device is a headless device, and further comprising:

at the device:

providing the unique identifier of the eSIM to a device registrar, wherein the device registrar obtains, from the enterprise, an indication that the unique identifier of the eSIM is associated with the enterprise;

obtaining, from the device registrar, bootstrapping credentials to connect to the network of the enterprise; and based on the bootstrapping credentials, connecting to the network of the enterprise.

7. A system comprising:

a device having an embedded Subscriber Identification Module (eSIM); and a server, wherein the server is configured to:

obtain, from the device, a unique identifier of the eSIM;

validate the device based on the unique identifier of the eSIM;

provide, to the device, a unique credential for a profile of the eSIM, wherein the profile of the eSIM corresponds to a network of an enterprise; and provide, to a credential database, the unique credential for the profile of the eSIM, wherein the credential database including the unique credential for the profile of the eSIM indicates that the device is permitted to access the network of the enterprise, and wherein the device is configured to:

provide, to the network of the enterprise, the unique credential for the profile of the eSIM; and in response to the credential database including the unique credential for the profile of the eSIM, obtain access to the network of the enterprise.

8. The system of claim 7, wherein the device is a headed device, and wherein the server is further configured to:

provide, to the device, a request for user credentials; and obtain, from the device, the user credentials.

9. The system of claim 7, further comprising a device registrar, wherein the device is a headed device, and wherein the device is configured to:

provide, to the device registrar, the unique identifier of the eSIM; and obtain, from the device registrar, information identifying a plurality of potential enterprises including the enterprise.

10. The system of claim 9, wherein the device is further configured to:

generate a graphical representation of the information identifying the plurality of potential enterprises;

obtain a selection of the enterprise from the plurality of potential enterprises;

in response to obtaining the selection of the enterprise, provide an indication of the enterprise to the device registrar;

obtain, from the device registrar, bootstrapping credentials for connecting to the network of the enterprise; and based on the bootstrapping credentials, connect to the network of the enterprise.

11. The system of claim 7, wherein the device is a headless device, and wherein the server is further configured to:

obtain, from the enterprise, an indication that the unique identifier of the eSIM is associated with the enterprise.

12. The system of claim 7, wherein the device is a headless device, and wherein the device is further configured to:

provide the unique identifier of the eSIM to a device registrar, wherein the device registrar obtains, from the enterprise, an indication that the unique identifier of the eSIM is associated with the enterprise;

obtain, from the device registrar, bootstrapping credentials to connect to the network of the enterprise; and based on the bootstrapping credentials, connect to the network of the enterprise.

13. One or more non-transitory computer readable storage media encoded with instructions that, when executed by one or more processors of one or more of a server or a device having an embedded Subscriber Identification Module (eSIM), cause the one or more processors to:

obtain, from the device, a unique identifier of the eSIM;

validate the device based on the unique identifier of the eSIM;

provide, to the device, a unique credential for a profile of the eSIM, wherein the profile of the eSIM corresponds to a network of an enterprise, and wherein the device provides, to the network of the enterprise, the unique credential for the profile of the eSIM; and provide, to a credential database, the unique credential for the profile of the eSIM, wherein in response to the credential database including the unique credential for the profile of the eSIM, the device obtains access to the network of the enterprise.

14. The one or more non-transitory computer readable storage media of claim 13, wherein the device is a headed device, and wherein the instructions further cause the one or more processors to:

provide, to the device, a request for user credentials;

obtain, from the device, the user credentials; and in response to obtaining the user credentials, provide the unique credential for the profile of the eSIM to the device.

15. The one or more non-transitory computer readable storage media of claim 13, wherein the device is a headed device, and wherein the instructions further cause the one or more processors to:

provide, to a device registrar, the unique identifier of the eSIM; and obtain, from the device registrar, information identifying a plurality of potential enterprises including the enterprise.

16. The one or more non-transitory computer readable storage media of claim 13, wherein the device is a headless device, and wherein the instructions further cause the one or more processors to:
obtain, from the enterprise, an indication that the unique identifier of the eSIM is associated with the enterprise.

17. The one or more non-transitory computer readable storage media of claim 13, wherein the device is a headless device, and wherein the instructions further cause the one or more processors to:
provide the unique identifier of the eSIM to a device registrar, wherein the device registrar obtains, from the enterprise, an indication that the unique identifier of the eSIM is associated with the enterprise;
obtain, from the device registrar, bootstrapping credentials to connect to the network of the enterprise; and
based on the bootstrapping credentials, connect to the network of the enterprise.

18. The one or more non-transitory computer readable storage media of claim 15, wherein the instructions further cause the one or more processors to:
generate a graphical representation of the information identifying the plurality of potential enterprises;
obtain a selection of the enterprise from the plurality of potential enterprises;
in response to obtaining the selection of the enterprise, provide an indication of the enterprise to the device registrar;
obtain, from the device registrar, bootstrapping credentials for connecting to the network of the enterprise; and
based on the bootstrapping credentials, connect to the network of the enterprise.

19. The method of claim 2, further comprising:
at the server:
in response to obtaining the user credentials, providing the unique credential for the profile of the eSIM to the device.

20. The system of claim 8, wherein the server is further configured to:
in response to obtaining the user credentials, provide the unique credential for the profile of the eSIM to the device.

* * * * *